US009940472B2

(12) United States Patent
Akkiraju et al.

(10) Patent No.: US 9,940,472 B2
(45) Date of Patent: Apr. 10, 2018

(54) EDGE ACCESS CONTROL IN QUERYING FACTS STORED IN GRAPH DATABASES

(71) Applicant: International Business Machines Corporation, Armonk, NY (US)

(72) Inventors: Rama Kalyani T. Akkiraju, Cupertino, CA (US); Debdoot Mukherjee, Kolkata (IN); Taiga Nakamura, Santa Clara, CA (US); Mu Qiao, Campbell, CA (US); Hovey Raymond Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 14/592,456

(22) Filed: Jan. 8, 2015

(65) Prior Publication Data
US 2016/0203327 A1    Jul. 14, 2016

(51) Int. Cl.
*G06F 17/30*    (2006.01)
*G06F 21/62*    (2013.01)

(52) U.S. Cl.
CPC .... *G06F 21/6218* (2013.01); *G06F 17/30958* (2013.01); *G06F 21/6227* (2013.01)

(58) Field of Classification Search
CPC combination set(s) only.
See application file for complete search history.

(56) References Cited

U.S. PATENT DOCUMENTS

| | | | |
|---|---|---|---|
| 5,966,715 A | 10/1999 | Sweeney et al. | |
| 6,308,181 B1 | 10/2001 | Jarvis | |
| 6,944,777 B1 | 9/2005 | Belani et al. | |
| 8,881,288 B1* | 11/2014 | Levy | G06F 21/577 709/225 |
| 9,602,513 B2* | 3/2017 | Gamage | H04L 63/10 |
| 2009/0097418 A1* | 4/2009 | Castillo | H04L 41/12 370/255 |
| 2010/0198804 A1 | 8/2010 | Yaskin et al. | |
| 2013/0132381 A1 | 5/2013 | Chakrabarti et al. | |
| 2014/0082568 A1 | 3/2014 | Hulet et al. | |
| 2015/0135261 A1* | 5/2015 | Park | H04L 63/102 726/1 |

OTHER PUBLICATIONS

Angles, Renzo et al., "Survey of Graph Database Models", ACM Computing Surveys, Feb. 2008, 39 pages, vol. 40, No. 1, Article 1, ACM, New York, NY, USA.

(Continued)

*Primary Examiner* — Shyue Jiunn Hwa
(74) *Attorney, Agent, or Firm* — Ference & Associates LLC

(57) ABSTRACT

Methods and arrangements for managing user access to a graph database. Nodes are represented in a graph, along with edges which interconnect the nodes. One or more facts are associated with each of the edges, and an access control list is provided with respect to one or more facts associated with one or more of the edges. There is restricted user access to one or more facts associated with the one or more of the edges, based on the access control list. Other variants and embodiments are broadly contemplated herein.

18 Claims, 10 Drawing Sheets

(56) References Cited

OTHER PUBLICATIONS

Mohan, Sriram et al., "Access Control for XML—A Dynamic Query Rewriting Approach", Proceedings of the 31st VLDB Conference, Aug. 30-Sep. 2, 2005, Trondheim, Norway, 12 pages, ACM, New York, NY, USA.

Damiani, Ernesto et al., "A General Approach to Securely Querying XML," Jul. 17, 2007, 12 pages, Preprint submitted to Elsevier B.V., Amsterdam, Netherlands.

Hudson, Randy et al., "Analysis of Uniform and Discriminatory Price Auctions in Restructured Electricity Markets", Reliability & Markets: Consortium for Electric Reliability Technology Solutions (CERTS), Jul. 2000, 10 pages, available at: http://certs.lbl.gov/certs-randm-pubs.html, Accessed on Dec. 5, 2014.

* cited by examiner

EDGE ACCESS CONTROL IN QUERYING FACTS STORED IN GRAPH DATABASES

BACKGROUND

Generally, a graph, or graph network, can represent a mechanism to represent facts. A graph database, also known as a semantic information network or a network database, includes a (usually sparsely, but multiply connected) directed graph with information stored at named nodes and information relating nodes stored at named directed edges.

BRIEF SUMMARY

In summary, one aspect of the invention provides a method of managing user access to a graph database, said method comprising: utilizing at least one processor to execute computer code configured to perform the steps of: representing nodes in a graph; representing in the graph edges which interconnect the nodes; associating one or more facts with each of the edges; providing an access control list with respect to one or more facts associated with one or more of the edges; and restricting user access to one or more facts associated with one or more of the edges, based on the access control list.

Another aspect of the invention provides an apparatus for managing user access to a graph database, said apparatus comprising: at least one processor; and a computer readable storage medium having computer readable program code embodied therewith and executable by the at least one processor, the computer readable program code comprising: computer readable program code configured to represent nodes in a graph; computer readable program code configured to represent in the graph edges which interconnect the nodes; computer readable program code configured to associate one or more facts with each of the edges; computer readable program code configured to provide an access control list with respect to one or more facts associated with one or more of the edges; and computer readable program code configured to restrict user access to one or more facts associated with the one or more of the edges, based on the access control list.

A further aspect of the invention provides a computer program product for managing user access to a graph database, said computer program product comprising: a computer readable storage medium having computer readable program code embodied therewith, the computer readable program code comprising: computer readable program code configured to represent nodes in a graph; computer readable program code configured to represent in the graph edges which interconnect the nodes; computer readable program code configured to provide an access control list with respect to one or more facts associated with one or more of the edges; and computer readable program code configured to restrict user access to one or more facts associated with the one or more of the edges, based on the access control list.

An additional aspect of the invention provides a method comprising: representing nodes in a graph; representing in the graph edges which interconnect the nodes; associating one or more facts with each of the edges; and providing an access control list with respect to one or more facts associated with one or more of the edges, via: associating a secret with at least one of the edges; and permitting conditional override of the access control list relative to at least one of the edges; and creating a reduced graph based on one or more restrictions relative to one or more access control lists.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
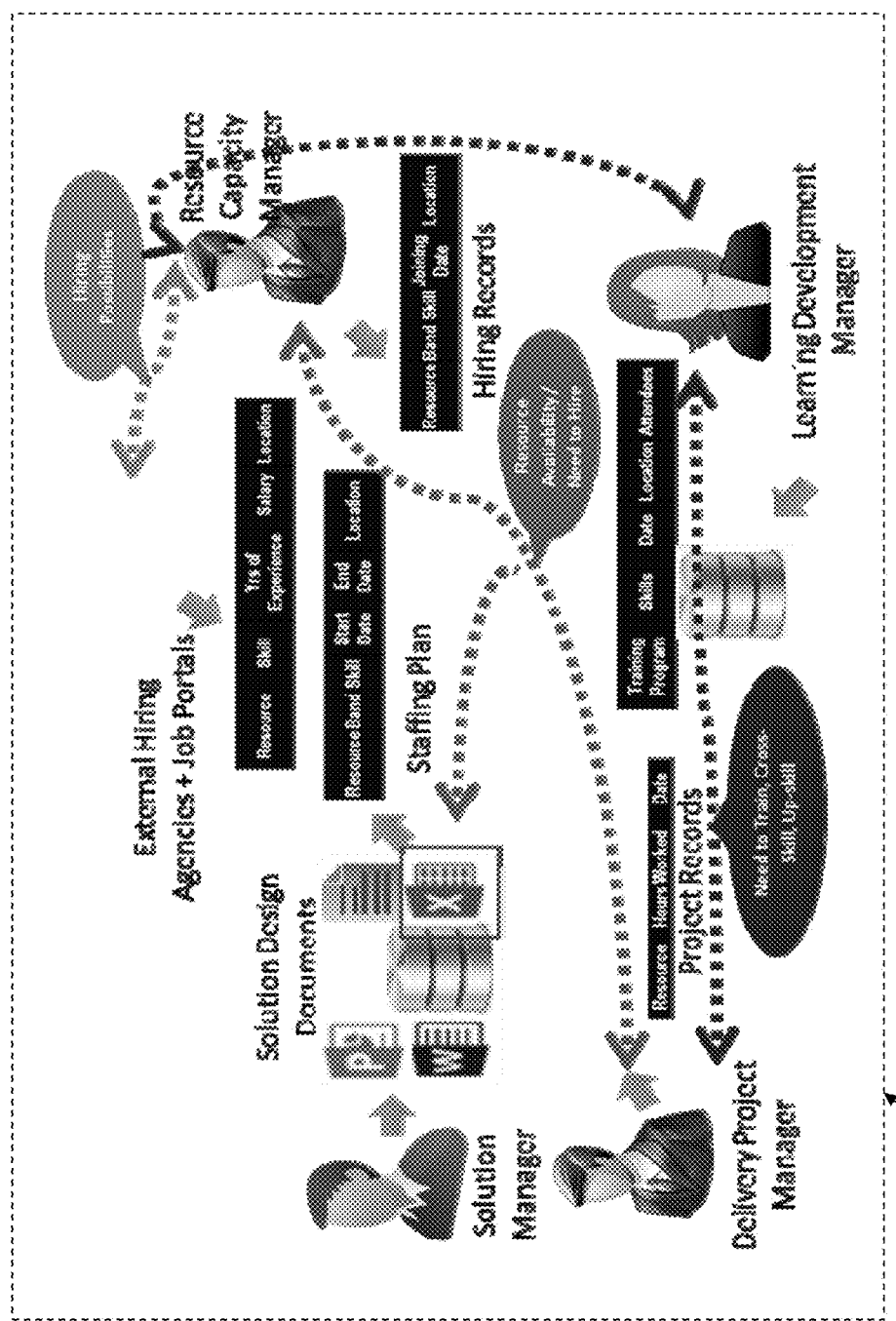
FIG. 1 schematically illustrates an operating context in which a graph database may be employed.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-8. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 10. In accordance with an exemplary embodiment, most if not all of the process steps, components and outputs discussed with respect to FIGS. 1-8 can be performed or utilized by way of a processing unit or units and system memory such as those indicated, respectively, at 16' and 28' in FIG. 10, whether on a server computer, a client computer, a node computer in a distributed network, or any combination thereof.

Broadly contemplated herein, in accordance with at least one embodiment of the invention, are methods and arrangements for managing user access to facts in a database, via: representing entities as nodes in a graph; representing facts relating two different entities as respective edges connecting those two entities; applying a list of types of secrets to at least one of the edges; and maintaining a lattice consisting of user roles and types of secrets, thereby defining roles that are allowed access to the one or more facts represented by the at least one of the edges. Moreover, the following steps can be undertaken responsive to a user attempt to execute a path query of the database: the roles of the user are mapped to a set of types of secrets in the lattice; each secret is mapped to a sub-graph of the graph; and the path query is compared to the union of the sub-graphs to check whether the user is permitted to receive the results of the path query execution.

The features discussed above, and others, relating to at least one embodiment of the invention, will be better appreciated from the discussion which follows.

Broadly contemplated herein, in accordance with at least one embodiment of the invention, are methods and arrangements for implementing access control for facts stored in a graph database. Rather than merely protect resources (analogous to nodes in a graph), there is permitted herein a more granular and complementary form of access control for facts by storing the access control lists on edges in the graph.

Generally, embodiments as broadly contemplated herein can be applied to any knowledge management system or cognitive application that models its data using graphs and hosts some sensitive information, which may be accessed by certain users but not all users. This may be of particular value when cognitive applications are developed to support knowledge workers in domains such as banking, insurance, healthcare, professional services, supply chain management, human resources, etc., where different roles are eligible to access different types of information.

Generally, in accordance with a context of at least one embodiment of the invention, graphs have represented a preferred abstraction for computer scientists and programmers for representing and processing data. Conventional arrangements involve technologies to store and query data that are modeled as graphs. Graph databases use graph structures with nodes, edges, and properties to represent and store data. "Nodes" represent entities such as people, businesses, accounts, artifacts, etc. "Edges" represent relationships between pairs of entities. "Properties" are pertinent information that relate to nodes or edges. Frameworks exist to support querying and analytics over graph data, and methods have been developed to answer various forms of user queries by traversing graphs.

A working example can illustrate the use of Entity-Relationship (ER) graphs in next-generation enterprise knowledge management systems, wherein at least one embodiment of the invention can help resolve conventional problems and issues. As such, FIG. 1 provides a schematic illustration of an operating context 102 in which a graph database may be employed. Here, different roles (e.g., Solution Manager, Resource Capacity Manager) in an IT service enterprise produce different types of information (e.g., solution design documents, hiring records, and resource engagement models).

Figure 2:
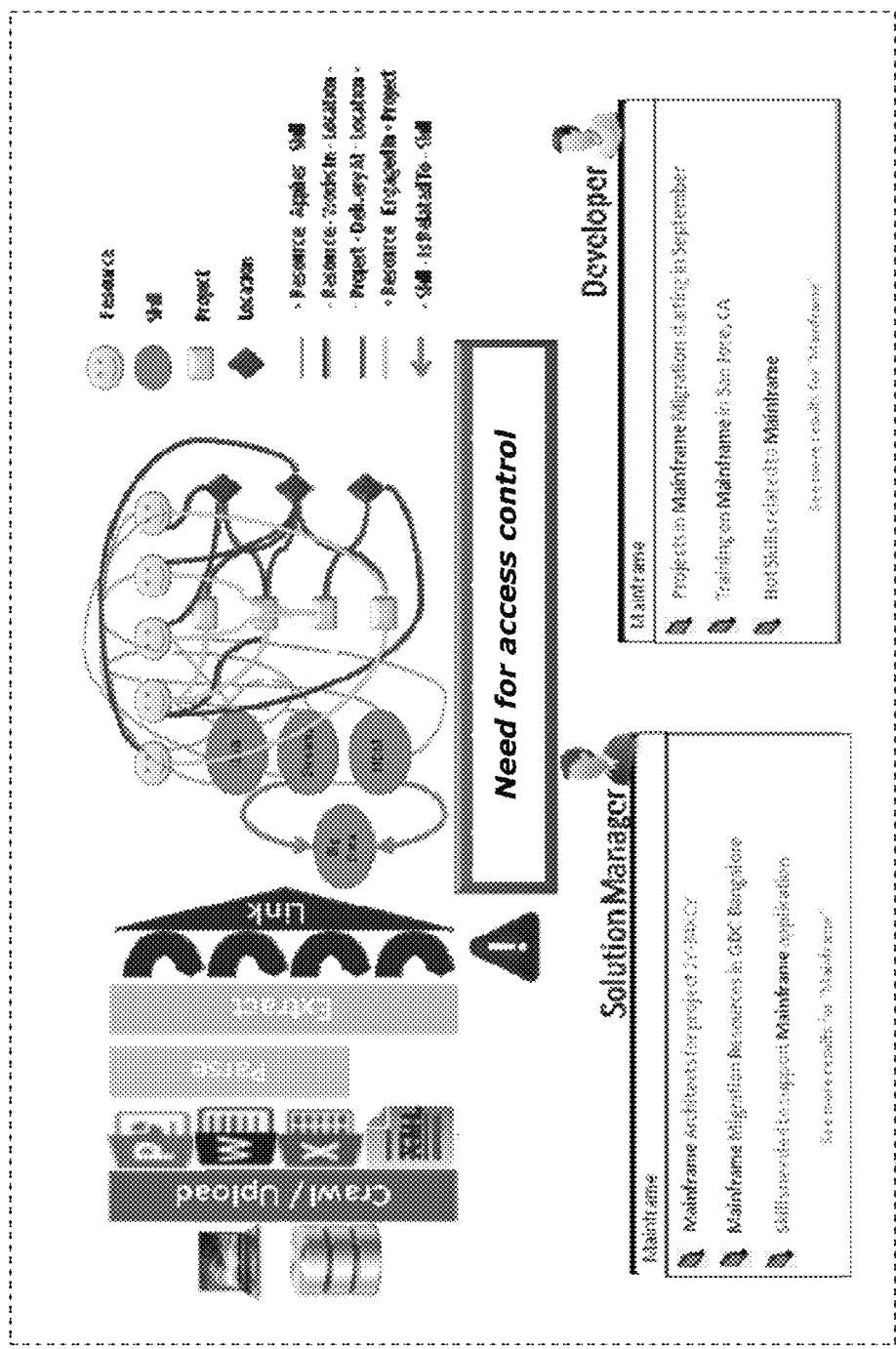
FIG. 2 schematically illustrates sample information entities and relationships that can be extracted from documents produced by the roles listed in FIG. 1.

Accordingly, a common problem encountered in the operating context of FIG. 1 is that information becomes "trapped" in locations such as individual laptops and team rooms. Thus, it is desirable for the documents siloed across multiple sources to be available for crawling and indexing in a manner that they can be searched by the entire organization. It can thus be appreciated that, for more effective querying than free-text keyword search, structured information entities can be extracted from the unstructured documents. Further, when pieces of information present in different artifacts are linked to each other, it leads to richer insights. For instance, the artifacts shown in FIG. 1 capture different complementary facets of information on a Resource, such as band, skill, trainings attended, project location, and years of experience. A graph provides an intuitive abstraction to link such related information. FIG. 2 shows, with respect to a network 203, sample information entities (e.g., Resource, Skill, Project, Location) and relationships (e.g., <Resource>Applies<Skill>, <Resource>Works-In<Location>) that can be extracted from HR (human resources) staffing documents produced by the roles listed in FIG. 1. Once an ER graph is available, different user queries can be answered through it. For example, potential queries may be: "Find mainframe migration resources in Bangalore, India", "Find training programs on Mainframe in San Jose, Calif.", etc.

Generally, in accordance with a context of at least one embodiment of the invention, it can be appreciated that there can be different approaches of answering queries on graph databases. Conventional approaches can involve transforming a user's query to express it in a graph database query language, or translating a keyword query to a structured query in SPARQL, which can be processed on triple stores. Yet another approach can involve mapping the graph into an inverted index and transform the queries such that they can be processed on such an index.

Generally, a key challenge that has been encountered conventionally is that not all users necessarily have the permissions they may need to view all of the information stored in a graph. For instance, a Solution Manager (as depicted in FIGS. 1 and 2) may be authorized to know about the skills of a resource but not about his/her salary, which may be confidential to certain roles in HR. Thus, in such a case, the knowledge management application would need to ensure that the results of queries from a Solution Manager do not contain salaries of individuals. It can be appreciated that problems relating to the protection of protecting sensitive information are present in many domains, such as financial services, insurance, healthcare, supply chains and the Internet.

Figure 3:
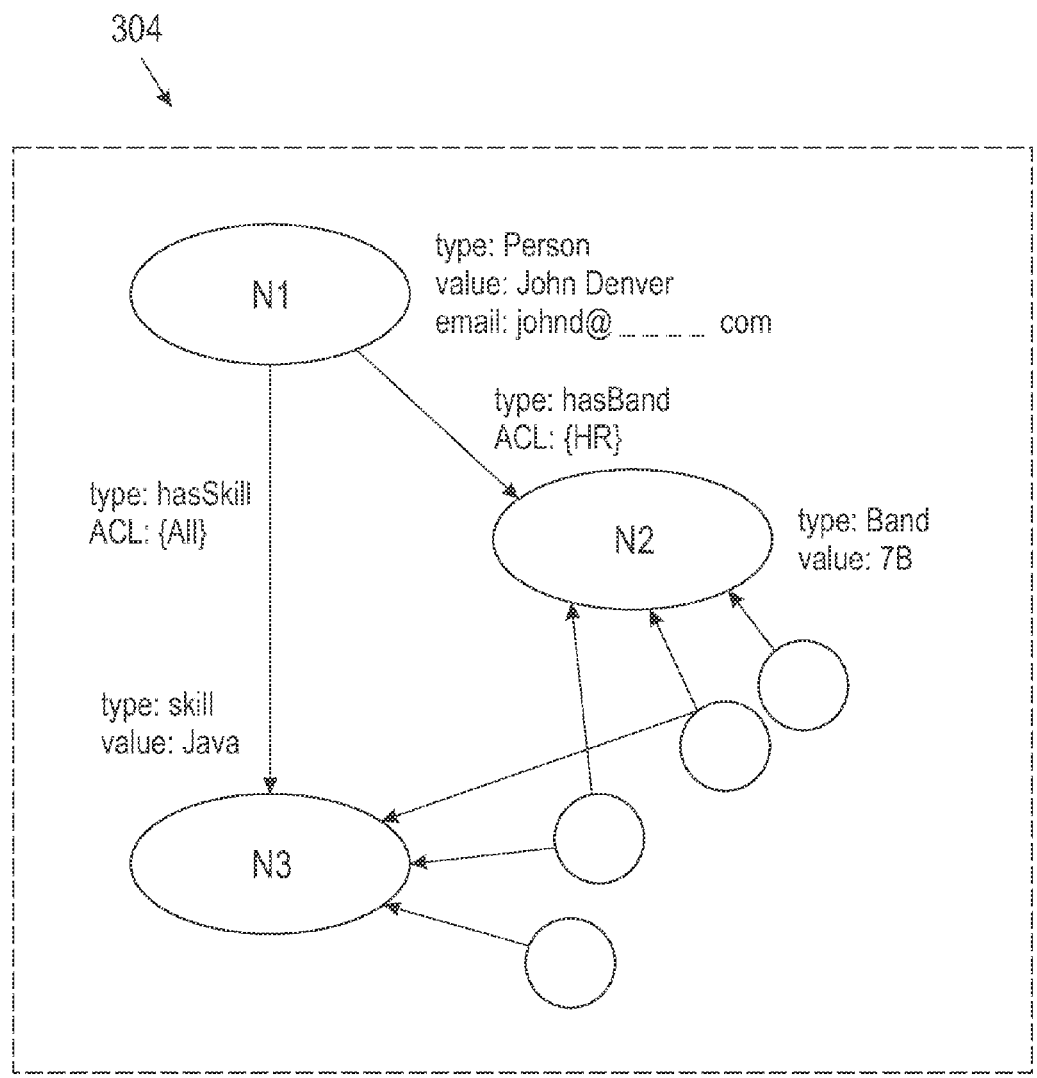
FIG. 3 schematically illustrates an example of graph data modeling.

Generally, in accordance with at least one embodiment of the invention, problems such as those discussed above are addressed in a context of controlling access to information that is stored as graphs. More particularly, there is broadly contemplated herein the use of a corresponding access control list for every edge in a graph, wherein each list defines a group of users who are authorized to know the fact represented by that edge. As such, a commonly encountered principle in modeling data in graphs involves storing atomic data as nodes, and linking related nodes using typed edges to reflect facts. (For background purposes, a comprehensive survey of different graph data models can be found in R. Angles et al., "Survey of graph database models", *ACM Computing Survey*, 40 (1): 1-39, 2008). In FIG. 3, a concrete example of data modeling is provided with respect to a graph network 304. Here, the node identified as N1 denotes the person "John Denver", N2 denotes a salary band "7B", and N3 denotes the skill "Java". The facts, "John Denver's salary band is 7B" and "John Denver is skilled in Java", are denoted by the edges (N1-->N2) and (N1-->N3) respectively. It can be noted that the singleton nodes do not convey much information by themselves, but a pair of nodes connected by edges can otherwise forward some information of greater interest. However, such information of its own accord may be more sensitive than that contained in singleton nodes.

Accordingly, in accordance with at least one embodiment of the invention, access control is implemented at the level of edges in a graph network or database. In accordance with the present example of FIG. 3, it can be seen that an Access Control List (ACL) on edge (N1, N2) indicates that the fact, "John Denver's salary band is 7B", should be known only to users in "HR"; whereas, the fact, "John Denver is skilled in Java" given by (N1, N3), can be known to "All" users. Conventionally, access control is generally implemented by modeling information as resources (e.g., files, documents, objects, services) which map to protection of nodes when the data are modeled as graphs. However, it will be appreciated herein that protecting access to information in edges can be advantageous in an era where facts may well be increasingly modeled as edges relating pairs of nodes.

It should be understood that, merely by way of illustrative example, and for purposes of helping impart a better understanding of embodiments of the invention, FIG. 3 and other figures herein depict a relatively small number of nodes and edges in a graph network. However, it should further be understood that practical applications of embodiments of the invention may well involve graph networks with a very large number of nodes and interconnecting edges, such as on the order of several thousand, or even hundreds of thousands, or more (of each). Generally, practical advantages associated with embodiments of the invention can be noted in a graph network of essentially any size, but such advantages can be appreciated more significantly in connection with larger-scale graph networks, even those including 1000 or more edges or even those including 100 or more edges.

In accordance with at least one embodiment of the invention, it should be generally understood and appreciated herein that, in the context of access control, there can be assumed two kinds of asymmetry between nodes and edges in graph databases. First, there can be assumed a source node from which access control is defined. It can be seen that the source node could be replaced by a source edge without loss of generality. Secondly, it can be assumed that requiring access to an edge is inconsistent with restricting access to its target node; but requiring access to a node while restricting access to an in-edge of that node is not necessarily inconsistent. The latter asymmetry follows from a more basic assumption that an edge carries only its name, the name of its immediate target, and the minimum information needed to specify a relationship between (the content of) its immediate source node and (the content of) its immediate target node. A graph database in which this asymmetry does not hold, can and should be converted to one in which it does hold in order to allow simplicity of edge representation. The conversion involves replacing information heavy edges by an in-edge, a node, and an out-edge. These and other considerations will be better appreciated from the ensuing discussion herebelow.

Figure 4:
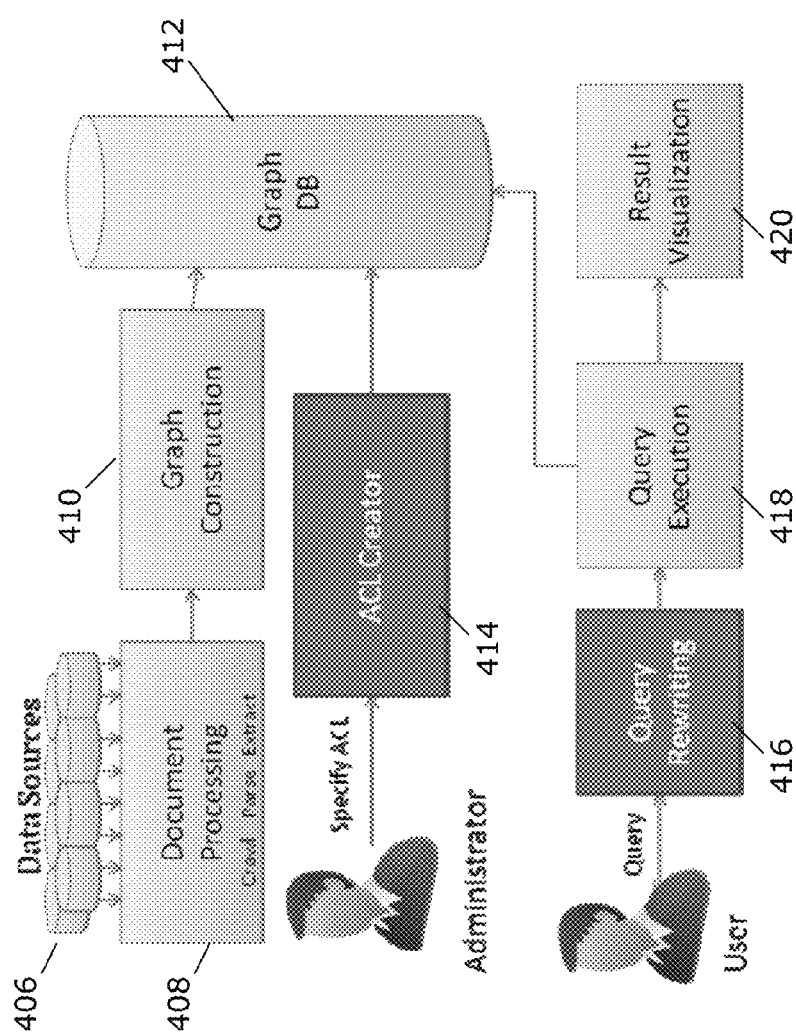
FIG. 4 schematically illustrates a general system architecture.

In accordance with at least one embodiment of the invention, FIG. 4 schematically illustrates a general system architecture. As discussed heretofore, data stored in a graph database are structured as nodes and edges. In order to arrive at this structured representation from the data that sit in different unstructured data sources (406), significant processing (408) may be required. In processing 408, a first step is to get data on the machine where the database exists, i.e., crawling (which may be defined as an activity to pull or download data from different data sources onto a single machine). Next, since the unstructured data may exist in different file formats, parsing takes place to extract text from these files. Then, essentially any suitable Information Extraction (IE) technique may be employed to mine structured data from the unstructured, free text or formatted text (e.g., HTML) documents. The term "fact", as employed herein, denotes a relationship between a pair of entities where both entities and the relationship have a clearly defined semantic (or type). For example, "John Denver"-(hasSkill)->"Java" [John Denver is skilled in Java] is a fact, which may be extracted from free text or from spreadsheets present in the corpus of data described heretofore. Here, "John Denver" is an entity of type "person", "Java" is an entity of type "skill", the relationship between the two entities has a type, "hasSkill". As noted heretofore, a collection of such entities and their inter-relationships forms an ER graph.

In accordance with at least one embodiment of the invention, the ER graph is constructed (410) and stored in a database 412. The ER graph is represented as a set of nodes and a set of edges connecting the nodes. A node is identified by a unique identifier (ID) and has a set of properties, each of which is a name-value pair. For instance, as shown and described herein with respect to FIG. 3, there is a node with the identifier N1, which has 3 properties. Each node must have a property named "type", which signifies the semantics of the node. In case of node N1, "type"="Person". Other properties of N1 are named as "value" and "email". An edge exists between a pair of nodes, one of which is called a source and the other is called a target. The edge is directed from the source to the target and is identified by the 2-tuple (<Source Node ID>, <Target Node ID>). Just like nodes, edges have a set of named properties as well. The "type" property of an edge specifies its semantics. For instance, in FIG. 3, (N1, N3) has "type"="hasSkill". As broadly contemplated herein, in accordance with at least one embodiment of the invention, each edge includes a mandatory named property, "ACL" (access control list), that can be used to implement access control for the fact implied by the edge.

In a manner to be better appreciated and understood herebelow, an administrator can create ACLs for edges in the graph via an ACL creator 414. When a user then wishes to issue query on a graph, he/she sends it to an engine (416) for query rewriting, whereupon the query is then executed (418) and results therefrom visualized or displayed (420).

In accordance with at least one embodiment of the invention, a "role" can be understood to represent an attribute of each user who queries a graph. In role based access control (RBAC), as broadly contemplated herein, the user base of the database/search system is segmented into different groups, each group being assigned a role. In any organization, the role of a user typically corresponds to his/her job functions. Generally, people in the same job function will have similar access privileges, hence they may be tagged to the same role. Generally, the role definitions are associated with a partial ordering that specifies the hierarchical inheritance relationships between different roles. If a person in role A has at least all access control privileges that any person in role B has, then the following representation can be made: role A≥role B.

In accordance with at least one embodiment of the invention, the ACL property on any edge specifies the set of roles wherein associated individuals are eligible to know about the fact that the edge represents. Accordingly, different approaches can be taken by system administrators to populate the values of ACL properties for the edges in graph. In one approach, a common ACL is defined for all edges of a particular type; thus, a common ACL serves to restrict the access of one or more users to one or more facts associated with two or more of the edges of a particular type. In accordance with the present working example, it may be the case that the information about a person's skill is not considered as sensitive, but the person's salary band is considered as sensitive. In such a case, all edges having type="hasSkill" have the ACL="All", to denote that it includes all users of system. Whereas all edges having type="hasBand" have the ACL="HR", which means that only users with a role of "HR" can know about those edges. Unless overridden, all edges in this case will indicate ACL="All".

Figure 5:
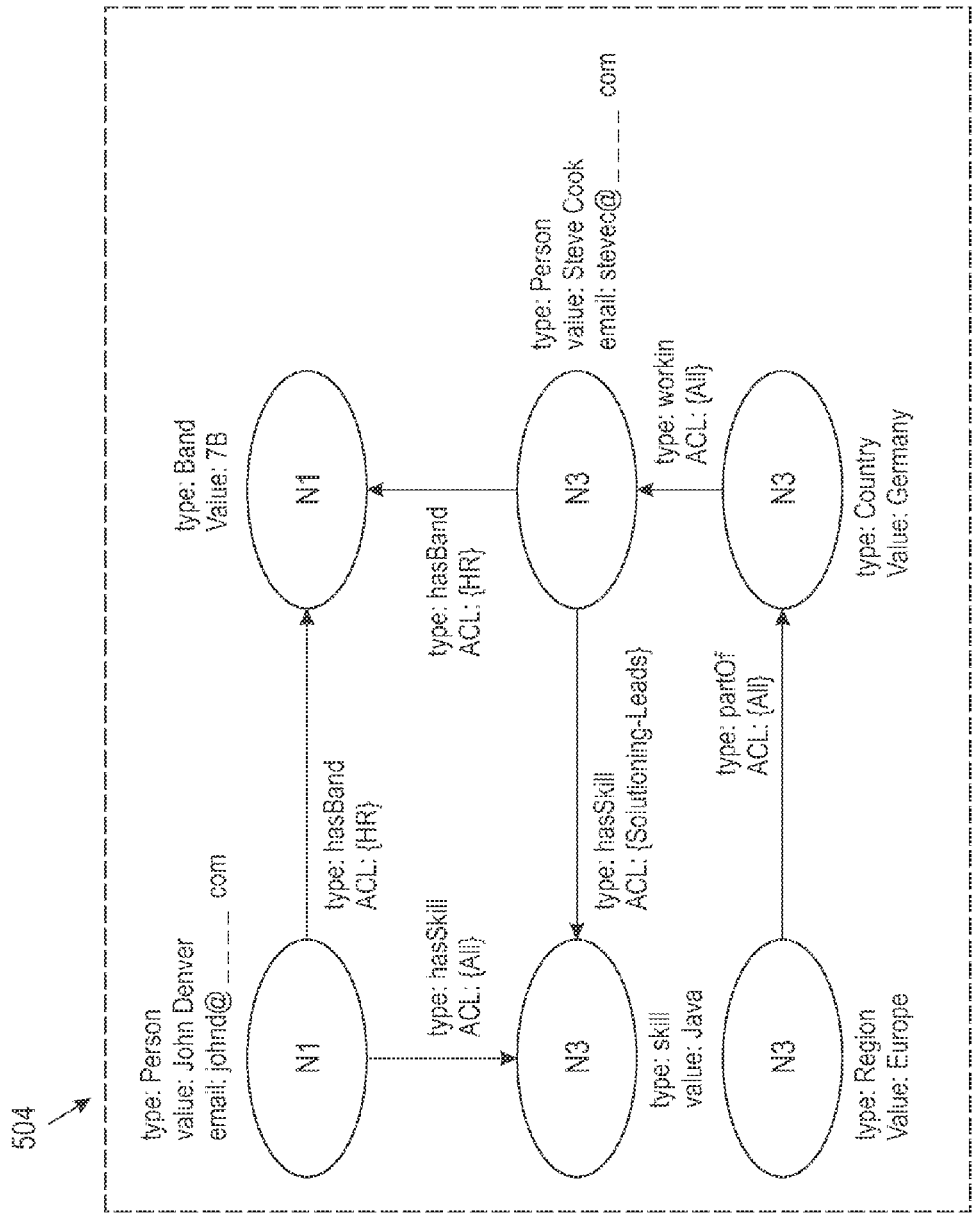
FIG. 5 schematically illustrates an example of conditional override of access control lists in a graph network.

In another approach in accordance with at least one embodiment of the invention, conditional ACL override on edges can be made available. As such, in more complex access control scenarios, assigning ACLs merely on edge types may not be possible. However, ACLs will be still stored on edges. Thus, an administrator can apply a strategy of defining ACL by edge types wherever possible. Then, ACL can be overridden on specific edges wherever more subtle forms of authorization become necessary. In such cases, the administrator can write a query to select the edges where ACLs need to be overridden and update their ACLs. FIG. 5 schematically illustrates a hypothetical scenario, relative to a graph network 504, in which a higher level of security for access to skill information of resources in Europe is restricted in view of tighter regulations with respect to data privacy. The administrator can issue a query to select all "hasSkill" edges from all person nodes who "workIn" countries that are "part of" Europe. The query can be written in any query language (e.g., Gremlin, SPARQL) that is supported by the graph database.

In another approach in accordance with at least one embodiment of the invention, ACLs can be specified for derived edges, or edges that are derived from other edges. Here, in the case of a fact that is associated with a derived edge, a role for permitting access to the fact can be defined as the set of users who have access to all the edges visited during the derivation of the new edge.

In accordance with at least one embodiment of the invention, it can be ensured that query execution modules in graph databases are augmented such that the execution of any query respects the authorization policies set by the ACLs on the edges of the graph. Two steps may be employed for enforcing authorizations. In a first step, an original graph is reduced to a smaller sub-graph by applying an EAC (edge access control) enforcement algorithm as described below.

In a second step, the importance is recognized of processing any query written in a graph query language by traversing the graph, via starting at any node and then hopping from one to another according to the constraints set in the query. For a query processor implementation to respect edge access control, at each hop a check is thus made as to whether the user is permitted to receive the results following that edge by comparing the path with the sub-graph obtained from the first aforementioned step.

In accordance with at least one embodiment of the invention, graph edges include a value (or type), an access control list, and a pointer to a node. Graph nodes can include a value (or identifier), a list of properties, and a list of out-edges. Note that access to a node provides the same user information as access to a node plus access to its out-edges because the access control lists and pointers are not readable by a user. Except for its value, the information in an edge is only usable by the system. Here, an access control policy is expressed by: a pair of functions, restricted and required. Each function points from the set of roles to: a set of nodes addressed by value, a set of edges addressed by value, and a set of edges addressed both by value and by the value of a node for which the edge is an out-edge. When node values are unique, every node and edge of the graph is uniquely addressable. Requirements can be marked in the original graph.

Figure 6:
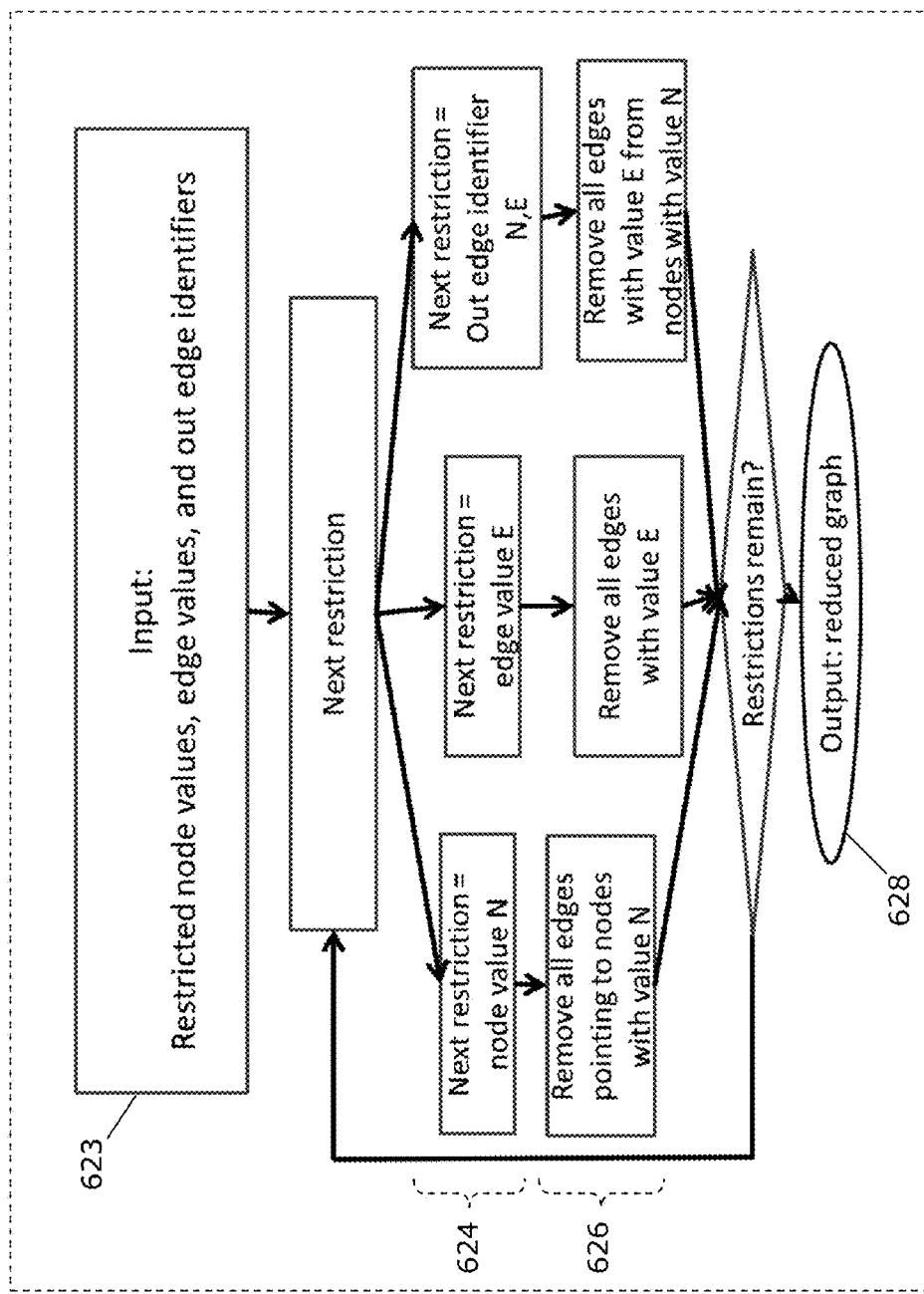
FIG. 6 schematically illustrates a process of graph reduction, in accordance with at least one embodiment of the invention.

FIG. 6 schematically illustrates a process 622 of graph reduction, in accordance with at least one embodiment of the invention. When this process is run and a reduced graph is produced, the reduced graph can be searched by depth-first search to check for all required nodes and edges. If all marked requirements are found, then the restrictions and requirements are feasible for EAC; otherwise (if some required node or edge is not found) then the restrictions and requirements are infeasible for EAC and for any other path oriented access control method. Once all restrictions are cycled through and changes to the graph have been made, the reduced graph is subsequently provided as output (628).

In accordance with at least one embodiment of the invention, as shown in FIG. 6, with input 623 comprising restricted node values, edge values and out-edge identifiers relative to a graph network, different restrictions 624 (node value N, edge value E and out-edge identifier N,E) are successively explored and actions are taken (626) if corresponding conditions are satisfied. Thus, in the present example, all edges pointing to nodes with value N are removed, all edges with value E are removed, or all edges with value E are removed from nodes with value N, depending on the form of the restriction.

Figure 7:
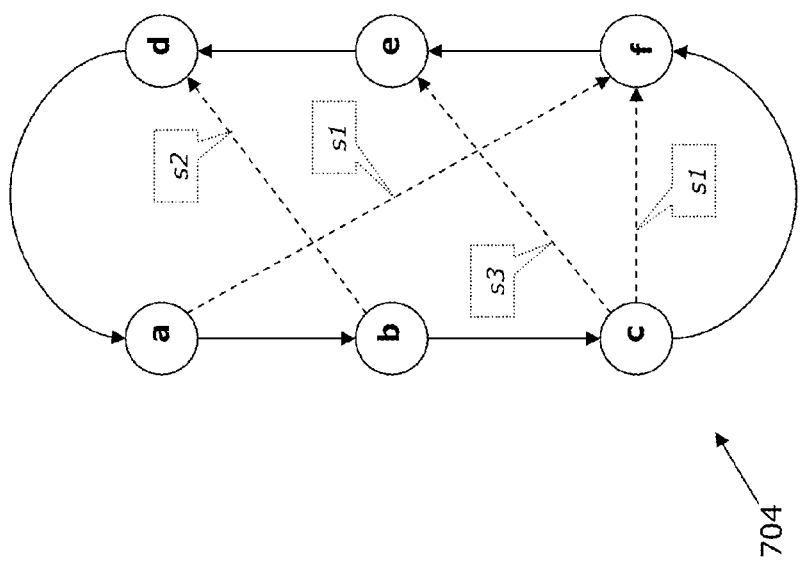
FIG. 7 schematically illustrates application of an algorithm to enforce edge access control.

FIG. 7 schematically illustrates application of an algorithm to enforce edge access control, with respect to a graph network 704, in accordance with at least one embodiment of the invention. As shown in the example of FIG. 7, to interconnect the six nodes a-f, there are four edge types: public (solid arrows), secret 1 (s1), secret 2 (s2), and secret 3 (s3). The secret edges s1, s2 and s3 each relate to facts that are presumed to be secret for (or inaccessible to) one or more users. Four user roles can be considered here: Admin, R1, R2, and Guest. In the present example, in terms of available permissions: Admin can access all edges; R1 can access edges s1, s3 and public edges; and R2 can access s2, s3 and public edges. Guest can only access public edges. The user roles are associated with a partial ordering that specifies the hierarchical inheritance relationships between different roles. Thus, it can be considered that a given role A≥role B, if a person in role A has at least all access control privileges that any person in role B enjoys. To this end, it may thus be inferred in the present example that: Admin≥R1≥Guest; and Admin≥R2≥Guest.

Figure 8:
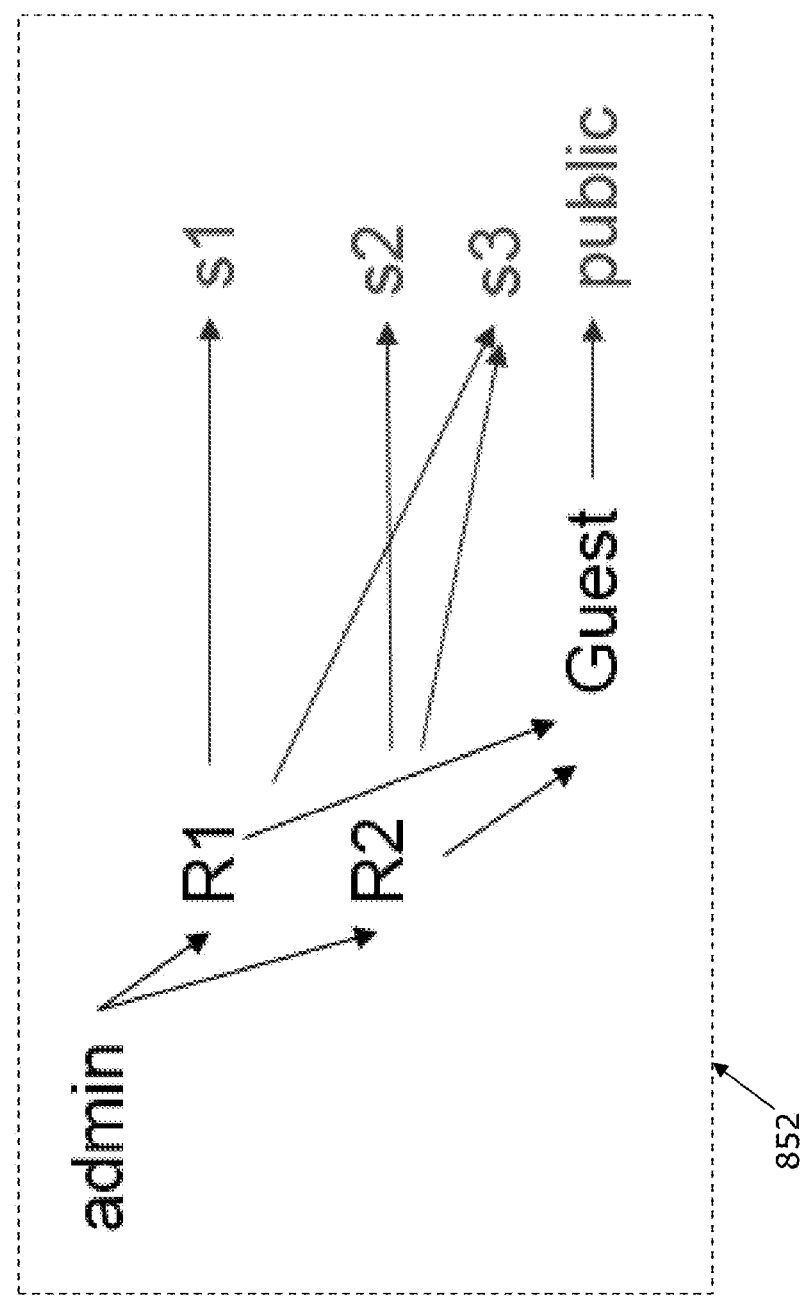
FIG. 8 schematically illustrates a lattice of user roles relative the graph network shown in FIG. 7.

To apply EAC (edge access control) in the present example, in accordance with at least one embodiment of the invention, some steps can be summarized. For each secret fact, a new edge type can be assigned, e.g.: secret 1, secret 2, . . . , secret n. Then, for each edge type, there can be found all the user roles that have access, ordered by their access privileges. A combined lattice of user roles can then be created, with a list of edge types that each user has access to; thus, with respect to each user, a sub-graph (or reduced graph, as discussed above with respect to FIG. 6) is identified. In accordance with the present example, such a lattice (852) may appear as shown in FIG. 8. For a user querying the graph (704 in FIG. 7), there is then computed the union of all the sub-graphs, each consisting of edge types that are connected to the roles that this user has and all the roles that are less privileged, in the lattice 852, and all the associated nodes. Accordingly, this union of sub-graphs obtained from the original graph contains all the information to which the querying user has access. If a user path query corresponds to edges in this union of sub-graphs then the query is allowed; otherwise, the query is not allowed. This access management computation can take place on a copy of the original graph that contains only edge type and access list information; it need not interfere with other actions taking place concurrently on the graph database.

In accordance with at least one embodiment of the invention, very generally, quantitative values as determined herein, or other data or information as used or created herein, can be stored in memory or displayed to a user on a screen, as might fit the needs of one or more users.

Figure 9:
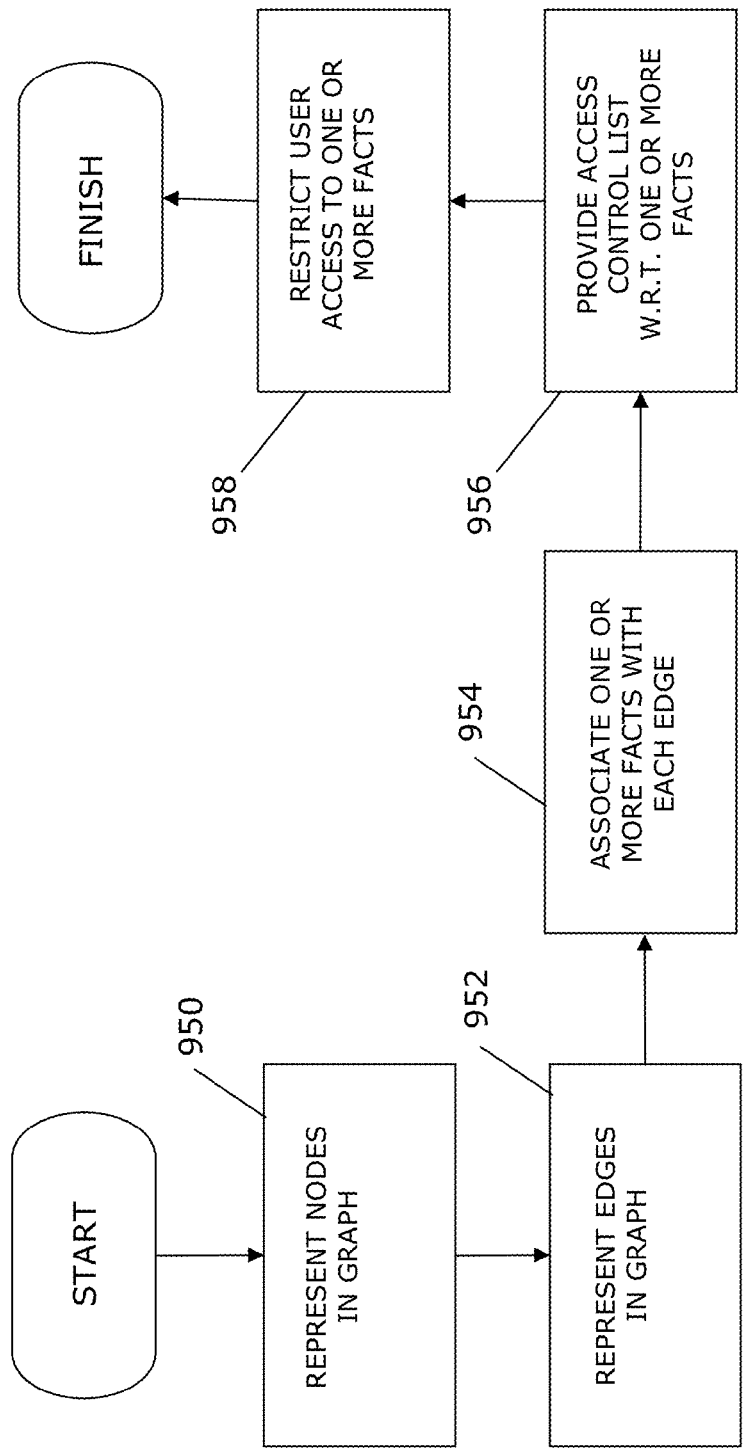
FIG. 9 sets forth a process more generally for managing user access to a graph database.

FIG. 9 sets forth a process more generally for managing user access to a graph database, in accordance with at least one embodiment of the invention. It should be appreciated that a process such as that broadly illustrated in FIG. 9 can be carried out on essentially any suitable computer system or set of computer systems, which may, by way of an illustrative and non-restrictive example, include a system such as that indicated at 12' in FIG. 10. In accordance with an example embodiment, most if not all of the process steps discussed with respect to FIG. 9 can be performed by way of a processing unit or units and system memory such as those indicated, respectively, at 16' and 28' in FIG. 10.

As shown in FIG. 9, in accordance with at least one embodiment of the invention, nodes are represented in a graph (950), along with edges which interconnect the nodes (952). One or more facts are associated with each of the edges (954), and an access control list is provided with respect to one or more facts associated with one or more of the edges (956). There is restricted user access to one or more facts associated with the one or more of the edges, based on the access control list (958).

Figure 10:
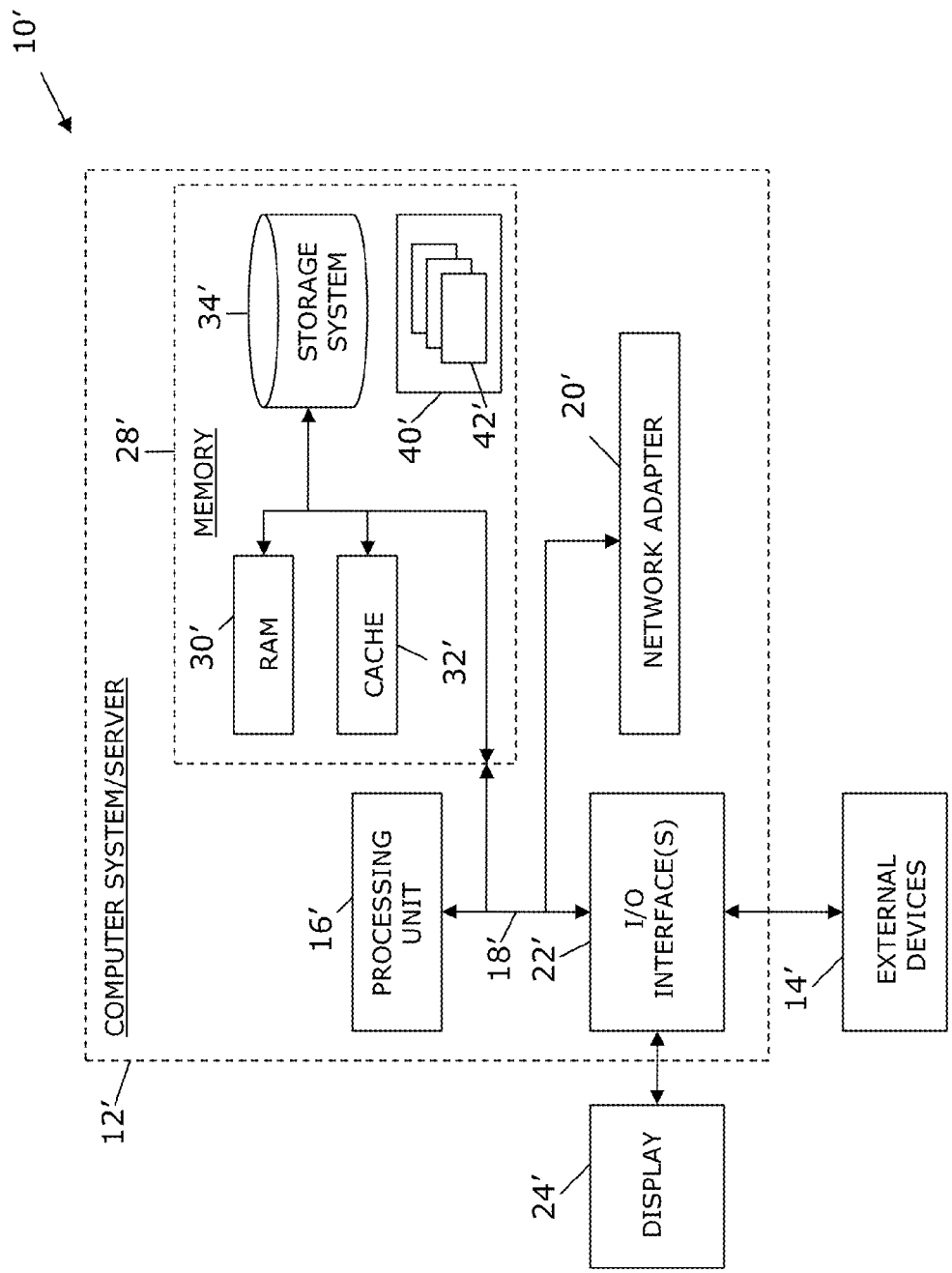
FIG. 10 illustrates a computer system.

Referring now to FIG. 10, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited took, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing user access to a graph database, said method comprising:
utilizing at least one processor to execute computer code configured to perform the steps of:
representing nodes in a graph, wherein each of the nodes represents an entity;
representing in the graph edges which interconnect the nodes, wherein each of the edges represent a relationship between the entities represented by the nodes connected by the edge;
associating one or more facts with each of the edges;
providing, for each of the one or more edges, an access control list with respect to the one or more facts associated with the corresponding edge, wherein the access control list identifies at least one role authorized to access the one or more facts associated with the corresponding edge; and
restricting user access to one or more facts associated with one or more of the edges, based on the access control list, wherein the restricting comprises identifying a role of an entity attempting to access the one or more facts associated with a target edge, accessing the access control list of the target edge, and determining when the entity is authorized to access the one or more facts based upon the role of the entity and the at least one role authorized by the access control list;
said restricting comprising creating a plurality of reduced graphs based on one or more restrictions relative to one or more access control lists, computing a union of the plurality of reduced graphs, and determining access for a querying user with respect to nodes and edges in the union of the plurality of reduced graphs.

2. The method according to claim 1, wherein said providing an access control list comprises associating a secret with at least one of the edges.

3. The method according to claim 2, wherein said providing an access control list comprises constructing a lattice which defines at least one user role relative to at least one secret associated with at least one of the edges.

4. The method according to claim 1, wherein said providing an access control list comprises permitting conditional override of the access control list relative to at least one of the edges.

5. The method according to claim 1, wherein
said providing an access control list comprises defining a common access control list with respect to two or more edges of a predetermined type, wherein the common access control list restricts user access to one or more facts associated with the two or more edges of the predetermined type.

6. The method according to claim 1, wherein said providing an access control list comprises specifying an access control list for an edge that is derived from another edge.

7. The method according to claim 1, wherein said creating a reduced graph comprises:
providing input relative to the one or more restrictions;
exploring each of the one or more restrictions relative to the graph; and
removing one or more components from the graph.

8. The method according to claim 7, wherein:
the one or more restrictions comprise a plurality of restrictions; and
said steps of exploring and removing are cycled through in succession, with respect to each of the one or more restrictions.

9. The method according to claim 7, wherein the one or more restrictions comprise one or more taken from the following:
(i) one or more restricted node values;
(ii) one or more edge values; and
(iii) one or more out-edge identifiers.

10. The method according to claim 1, comprising permitting user access to at least one information item associated with at least one of the nodes and edges.

11. The method according to claim 1, wherein the edges comprise at least 100 edges.

12. An apparatus for managing user access to a graph database, said apparatus comprising:
at least one processor; and
a computer readable storage medium having computer readable program code embodied therewith and executable by the at least one processor, the computer readable program code comprising:
computer readable program code configured to represent nodes in a graph, wherein each of the nodes represents an entity;
computer readable program code configured to represent in the graph edges which interconnect the nodes, wherein each of the edges represent a relationship between the entities represented by the nodes connected by the edge;
computer readable program code configured to associate one or more facts with each of the edges;

computer readable program code configured to provide, for each of the one or more edges, an access control list with respect to the one or more facts associated with the corresponding edge, wherein the access control list identifies at least one role authorized to access the one or more facts associated with the corresponding edge; and computer readable program code configured to restrict user access to one or more facts associated with the one or more of the edges, based on the access control list, wherein the restricting comprises identifying a role of an entity attempting to access the one or more facts associated with a target edge, accessing the access control list of the target edge, and determining when the entity is authorized to access the one or more facts based upon the role of the entity and the at least one role authorized by the access control list;

said restricting comprising creating a plurality of reduced graphs based on one or more restrictions relative to one or more access control lists, computing a union of the plurality of reduced graphs, and determining access for a querying user with respect to nodes and edges in the union of the plurality of reduced graphs.

13. The computer program product according to claim 12, wherein said computer readable program code is configured to provide an access control list via associating a secret with at least one of the edges.

14. The computer program product according to claim 12, wherein said computer readable program code is configured to provide an access control list via permitting conditional override of the access control list relative to at least one of the edges.

15. The computer program product according to claim 12, wherein providing an access control list comprises defining a common access control list with respect to two or more edges of a predetermined type, wherein the common access control list restricts user access to one or more facts associated with the two or more edges of the predetermined type.

16. The computer program product according to claim 12, wherein said computer readable program code is configured to provide an access control list via specifying an access control list for an edge that is derived from another edge.

17. A computer program product for managing user access to a graph database, said computer program product comprising:

a computer readable storage medium having computer readable program code embodied therewith, the computer readable program code comprising:

computer readable program code configured to represent nodes in a graph, wherein each of the nodes represents an entity;

computer readable program code configured to represent in the graph edges which interconnect the nodes, wherein each of the edges represent a relationship between the entities represented by the nodes connected by the edge;

computer readable program code configured to associate one or more facts with each of the edges;

computer readable program code configured to provide, for each of the one or more edges, an access control list with respect to the one or more facts associated with the corresponding edge, wherein the access control list identifies at least one role authorized to access the one or more facts associated with the corresponding edge; and computer readable program code configured to restrict user access to one or more facts associated with the one or more of the edges, based on the access control list, wherein the restricting comprises identifying a role of an entity attempting to access the one or more facts associated with a target edge, accessing the access control list of the target edge, and determining when the entity is authorized to access the one or more facts based upon the role of the entity and the at least one role authorized by the access control list;

said restricting comprising creating a plurality of reduced graphs based on one or more restrictions relative to one or more access control lists, computing a union of the plurality of reduced graphs, and determining access for a querying user with respect to nodes and edges in the union of the plurality of reduced graphs.

18. A method comprising:

representing nodes in a graph, wherein each of the nodes represents an entity;

representing in the graph edges which interconnect the nodes, wherein each of the edges represent a relationship between the entities represented by the nodes connected by the edge;

associating one or more facts with each of the edges; and providing, for each of the one or more edges, an access control list with respect to the one or more facts associated with the corresponding edge, wherein the access control list identifies at least one role authorized to access the one or more facts associated with the corresponding edge, via:

associating a secret with at least one of the edges;

permitting conditional override of the access control list relative to at least one of the edges; and restricting user access to one or more facts associated with one or more of the edges, based on the access control list, wherein the restricting comprises identifying a role of an entity attempting to access the one or more facts associated with a target edge, accessing the access control list of the target edge, and determining when the entity is authorized to access the one or more facts by creating a reduced graph based on one or more restrictions relative to one or more access control;

said restricting comprising creating a plurality of reduced graphs based on one or more restrictions relative to one or more access control lists, computing a union of the plurality of reduced graphs, and determining access for a querying user with respect to nodes and edges in the union of the plurality of reduced graphs.

* * * * *